Patented Mar. 29, 1932

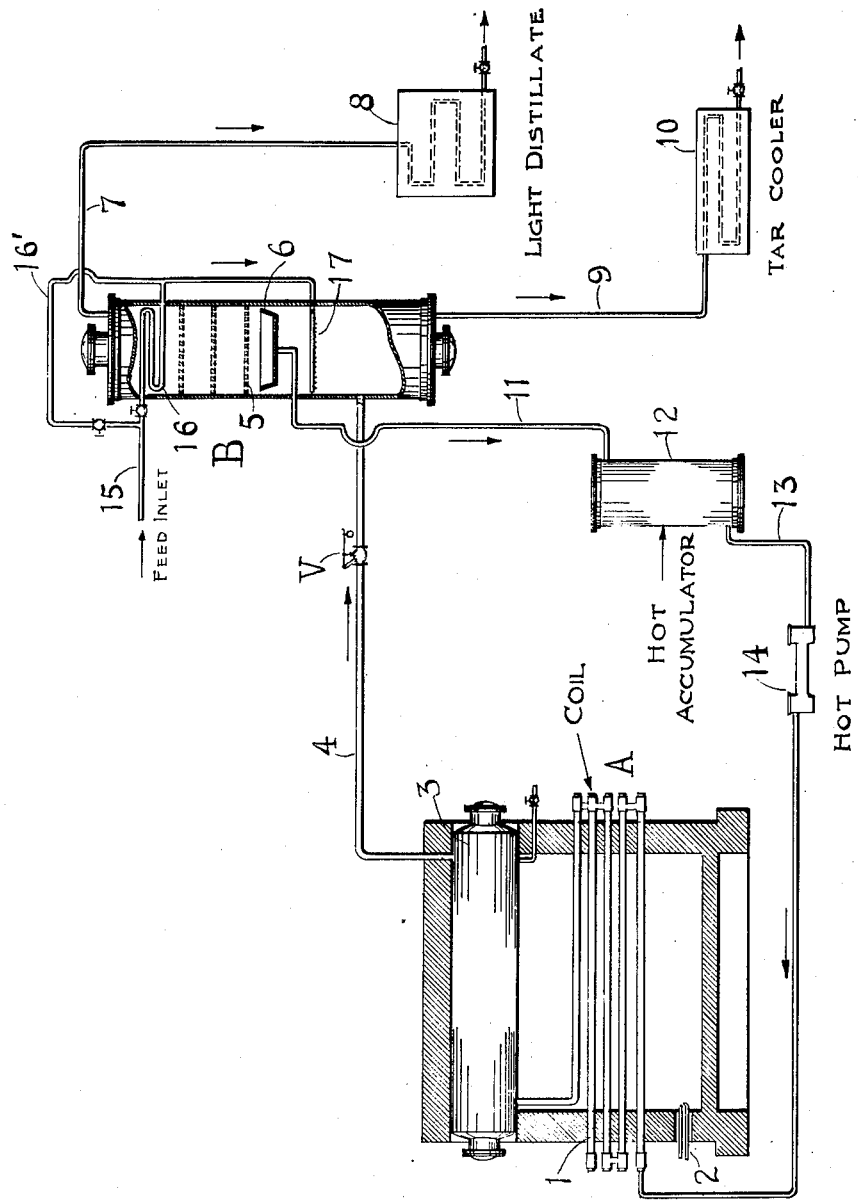

1,851,429

UNITED STATES PATENT OFFICE

FRANK A. HOWARD, OF ELIZABETH, NEW JERSEY, ASSIGNOR TO STANDARD OIL DEVELOPMENT COMPANY, A CORPORATION OF DELAWARE

PREPARING AND CRACKING HYDROCARBON MATERIALS

Application filed May 7, 1923. Serial No. 637,074.

This invention relates to the art of pyrolytic conversion of hydrocarbons to lower boiling products, and will be fully understood from the following description, taken in connection with the accompanying drawing which represents semi-diagrammatically a form of apparatus contemplated in the invention.

Referring more particularly to the drawing, the reference character A designates a heating conduit or coil of suitable construction, in the example shown a series of rows of parallel tubes 1 joined end to end by crossover connections, the detail of which is not shown, so as to allow flow in a consecutive path. Heat is supplied by an oil burner 2 or other desired means. Connecting on from the heated conduit is a digesting or cracking passageway, for example a drum 3 covered in so as to prevent substantial loss of the temperature acquired by the fluid while passing through the heating coil. From the drum 3 a vapor pipe 4 leads to discharge into the lower part of a vapor separator B having for instance rectifying plates 5 and a collecting pan 6. A vapor pipe 7 leads from the top of the vapor separator to a condenser 8 and receiver (not shown), and from the bottom of the vapor separator a residuum pipe 9 leads to a cooler 10 and tank (not shown). From the pan 6 a pipe 11 leads to a hot accumulator or insulated tank 12, and a pipe 13 therefrom with a hot pump 14 feeds the heating coil A. An inlet pipe 15 for admitting feed oil into the system, passes through a heat exchanger and controller 16, for example in the top of the vapor separator and connecting on therefrom is a suitable spray head 17 arranged for discharging the preheated oil in the path of the hot vapors coming to the vapor separator from the cranking zone. A valved by-pass 16' allows regulation of the temperature of the feed as desired.

In operation, the oil to be cracked is supplied through pipe 15 and after passing through the preheater is sprayed out at the head 17 into the hot vapors from the cracking passageway 3. The oil vaporizes more or less completely depending upon the particular stock employed and on the temperature and pressure conditions, and residuum settles down at the bottom of the vapor separator to be drawn off by pipe 9. The vapors rising pass to the rectifying plates, the light constituents escaping from the separator by pipe 7 and going to the condenser 8, while constituents desirable for cracking condense in the separator and being caught by the pan 6 are sent to the accumulator 12 to be forwarded from there to the coil A.

It is thus seen that an oil of any desired character may be preheated and then subjected very conveniently to vaporizing and separating conditions to segregate out and eliminate portions which are not desired in a cracking apparatus, such portions, for example asphalt etc. being eliminated via the tar line, while the crackable constituents are segregated and forwarded, without much loss of heat, to the cracking zone. At the same time, the heat of the vapors from the cracking zone is utilized advantageously.

An optional pressure control valve V may be provided in the pipe 4 to enable maintenance of whatever pressure may be desired in the cracking apparatus distinct from the vapor separating zone.

While I have described my invention with reference to certain specific details, it will be understood that this is for the purpose of illustration and is not limitative, and changes may be made which come within the spirit and scope of the invention.

What I claim is:

1. Apparatus of the character described, which comprises a heating conduit, a digesting or cracking passageway connected with said conduit, a vapor separator for receiving vapors from the cracking passageway, a preheater in the top of the vapor separator, a spray head receiving oil from the preheater and discharging in the path of the hot vapors from the cracking passageway, means for separately discharging unvaporized portions of the oil, a collecting pan for collecting crackable condensate, a hot accumulator draining from the pan, and a feed line from the hot accumulator to the heating conduit first mentioned.

2. Apparatus of the character described which comprises a heating conduit, a digesting or cracking passageway connected with said conduit, a vapor separator, a conduit for conveying vapors from the cracking passageway to the vapor separator, a preheater, a sprayer receiving oil from the preheater and discharging in effective heat interchanging relation to hot vapors from the cracking passageway, means for eliminating unvaporized portions, a collecting pan in the vapor separator for collecting crackable condensate, and means for supplying the crackable condensate without much temperature loss to the heating conduit first mentioned.

3. The improvement in the art of pyrolytic conversion of hydrocarbons, which comprises passing hot vapors from a cracking zone into fractionating means, cooling the upper portion of said means by passing cool feed stock through a coil therein, discharging the feed stock in effective heat interchanging relation to hot vapors entering the fractionating means, whereby crackable constituents are volatilized from the feed stock, condensing such crackable constituents in said means, and withdrawing such condensate substantially free from admixture with unvolatilized feed stock.

4. The improvement in the art of pyrolytic conversion of hydrocarbons, which comprises heating the hydrocarbons, passing them in heated condition to a digesting zone wherein conversion takes place on acquired heat, passing the hot product from the digesting zone into fractionating means, cooling the upper portion of said means by passing cool feed stock through a coil therein, discharging the feed stock in effective heat interchanging relation to the hot product entering the fractionating means, whereby crackable constituents are volatilized from the feed stock, condensing such crackable constituents in said means, withdrawing such condensate substantially free from admixture with unvolatilized feed stock, and passing the condensate to the initial heating step.

5. Apparatus of the character described which comprises a heating conduit, a digestive or cracking passageway connected with said conduit, a preheater, a chamber, a sprayer receiving oil from the preheater and discharging into the chamber in the path of the hot vapors from the cracking passageway, means for withdrawing liquid residuum from said chamber, means for partially condensing the vapors produced in said chamber, means for separately collecting the condensate, means for supplying the condensate, substantially free from residuum, to the heating conduit.

FRANK A. HOWARD.